J. L. McFARLAND.
STEERING WHEEL ATTACHMENT.
APPLICATION FILED MAR. 14, 1919.

1,320,254.

Patented Oct. 28, 1919.

WITNESS:
Guy M. Spring
U. B. Hillyard.

INVENTOR.
John L. McFarland
BY
Richard B. Owen
ATTORNEY.

UNITED STATES PATENT OFFICE.

JOHN L. McFARLAND, OF TANGENT, OREGON.

STEERING-WHEEL ATTACHMENT.

1,320,254.  Specification of Letters Patent.  Patented Oct. 28, 1919.

Application filed March 14, 1919. Serial No. 282,693.

*To all whom it may concern:*

Be it known that I, JOHN L. MCFARLAND, a citizen of the United States, residing at Tangent, in the county of Linn and State of Oregon, have invented certain new and useful Improvements in Steering-Wheel Attachments, of which the following is a specification.

Certain types of machines such as motor vehicles include steering mechanism which embodies a steering wheel which must at all times be under control of the operator and in practice steering mechanism of this type is fatiguing, nerve wrecking and uncomfortable because of the constant care required to be exercised and the transmitting of every shock and sudden movement to the hand and arms of the operator.

The present invention provides means for use in conjunction with steering wheels to facilitate their operation and to yieldingly hold the same in a given position so that when traveling in a direct course the operator may release the hold upon the steering wheel with the assurance that the same will be held in a position to direct and maintain the vehicle in a straight course.

In the drawing.

Corresponding and like parts are referred to in the following description and indicated in both views of the drawing by like reference characters.

Figure 1:
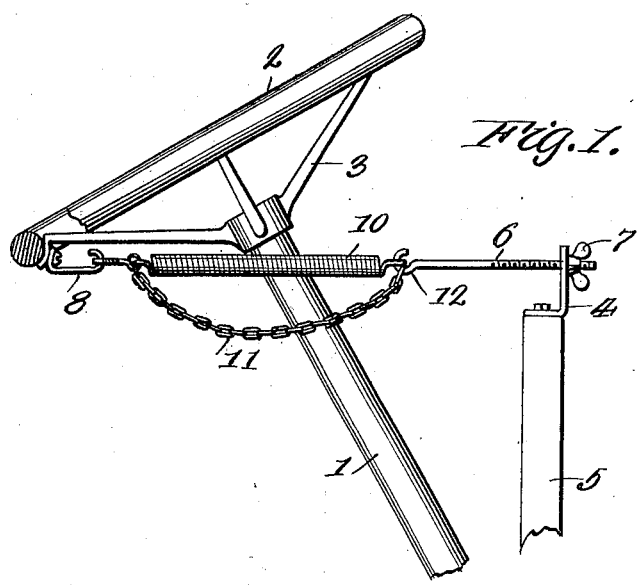
Figure 1 is a detail view in elevation, showing the application of the invention.
Figure 2:
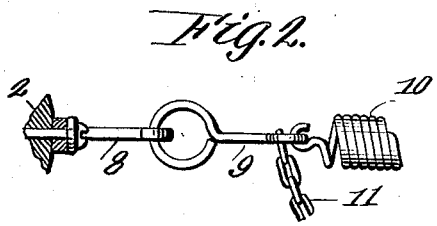
Fig. 2 is a fragmentary view.

The steering post 1 is provided at its upper end with the usual steering wheel comprising rim 2 and spider 3. A bracket 4 is attached to a suitable support 5 of the machine and is apertured to receive the threaded end of a rod 6 upon which is mounted a thumb nut 7. A hook 8 is attached to the rim of the steering wheel by one of the fastenings employed for securing an arm of the spider thereto. A coupling 9 is engaged at one end with the hook 8 and its opposite end receives a contractile vehicle spring 10 and a bridle 11. The coupling 9 is provided at its ends with eyes for convenience of engaging the parts to be connected thereby. The opposite ends of the spring 10 and bridle 11 are engaged with the rod 6 which for convenience is provided at its inner end with a hook 12.

The spring 10 may be of any length and tension. The bridle 11 may be a flexible connection of any nature and preferably consists of a short length of chain, the links providing for lengthening or shortening the effective part of the bridle so that the stretch or expansion of the spring 10 may be controlled to prevent overstraining. The thumb nut 7 provides for regulating the tension of the spring 10. When the parts are in operative position they are disposed substantially as illustrated in Fig. 1 and serve to hold the steering wheel in a given position so that the vehicle will move in a straight course. It will be understood that the usual shock experienced by the operator is neutralized by the present invention and moreover the operator is not required to maintain a constant hold upon the steering wheel and that the hands may be entirely removed from the steering wheel when the vehicle is traveling in a straight course. In this manner the operator does not experience fatigue or the other ill results incident to a constant hold upon the steering wheel for a great length of time.

The invention is adapted for motor vehicles and craft of every type and is particularly advantageous when applied to farm tractors since it enables the farmer to walk across the field when desired thereby relieving the task and inconvenience usually experienced when operating tractors requiring the operator to remain in his seat and exercise constant control of the steering wheel.

The foregoing description and the drawing have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. In combination with a steering wheel, means for yieldably holding the same in a given position, the same consisting of a spring coupled to the steering wheel and means for subjecting the spring to tension.

2. In combination with a steering wheel, means for yieldably holding the same in a given position, the same consisting of a spring coupled to the steering wheel and means for subjecting the spring to a variable tension.

3. In combination with a steering wheel, means for yieldably holding the same in a given position, the same consisting of a helical spring and a bridle for limiting the stretch of the spring to prevent overstraining thereof.

4. In combination with a steering wheel, a contractile helical spring, means for connecting the spring at one end to the steering wheel, means adjustably connecting the opposite end of the spring to a suitable support and a bridle spanning the spring to limit the stretch thereof and prevent overstraining.

In testimony whereof I affix my signature in presence of two witnesses.

JOHN L. McFARLAND.

Witnesses:
G. M. JENKINS,
J. J. LINDGRE.

Copies of this patent may be obtained for five cents each, by addressing the "Commissioner of Patents, Washington, D. C."